United States Patent
Tani et al.

[11] Patent Number: 6,073,850
[45] Date of Patent: Jun. 13, 2000

[54] OPTICAL READER FOR INFORMATION PATTERN REPRESENTING CODED DATA

[75] Inventors: Nobuhiro Tani; Tetsuya Abe; Shuzo Seo, all of Tokyo, Japan

[73] Assignee: Asahi Kogaku Kogyo Kabushiki Kaisha, Tokyo, Japan

[21] Appl. No.: 08/919,771

[22] Filed: Aug. 29, 1997

[30] Foreign Application Priority Data

Aug. 30, 1996 [JP] Japan ................................ P08-248594

[51] Int. Cl.[7] .................................................. G06K 7/10
[52] U.S. Cl. ............................ 235/462.28; 235/462.11; 235/455
[58] Field of Search ....................... 235/462.11, 462.09, 235/462.28, 462.45, 455

[56] References Cited

U.S. PATENT DOCUMENTS

| | | |
|---|---|---|
| 5,150,150 | 9/1992 | Enomoto . |
| 5,541,693 | 7/1996 | Enomoto . |
| 5,576,527 | 11/1996 | Sawanobori . |
| 5,591,952 | 1/1997 | Krichever et al. ...................... 235/462 |
| 5,600,699 | 2/1997 | Suzuki et al. ............................. 378/38 |

FOREIGN PATENT DOCUMENTS 9-6891  1/1997  Japan .

*Primary Examiner*—Thien M. Le
*Assistant Examiner*—Daniel H. Sherr
*Attorney, Agent, or Firm*—Greenblum & Bernstein, P.L.C.

[57] ABSTRACT

A casing of an optical reader comprises a reading head and a handle. The reading head includes a frame portion having a bottom opening constituted as a parallelogram. The optical reader comprises an angular speed sensor. The optical reading is controlled in accordance with the trembling speed of the casing sensed by the angular speed sensor.

11 Claims, 11 Drawing Sheets

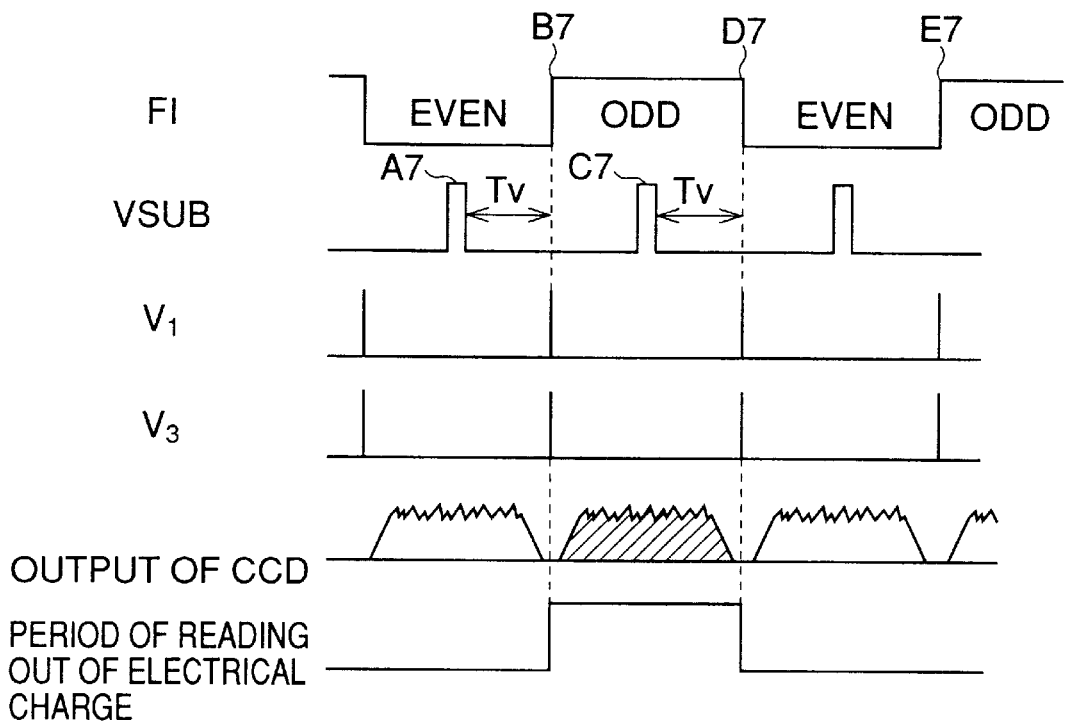
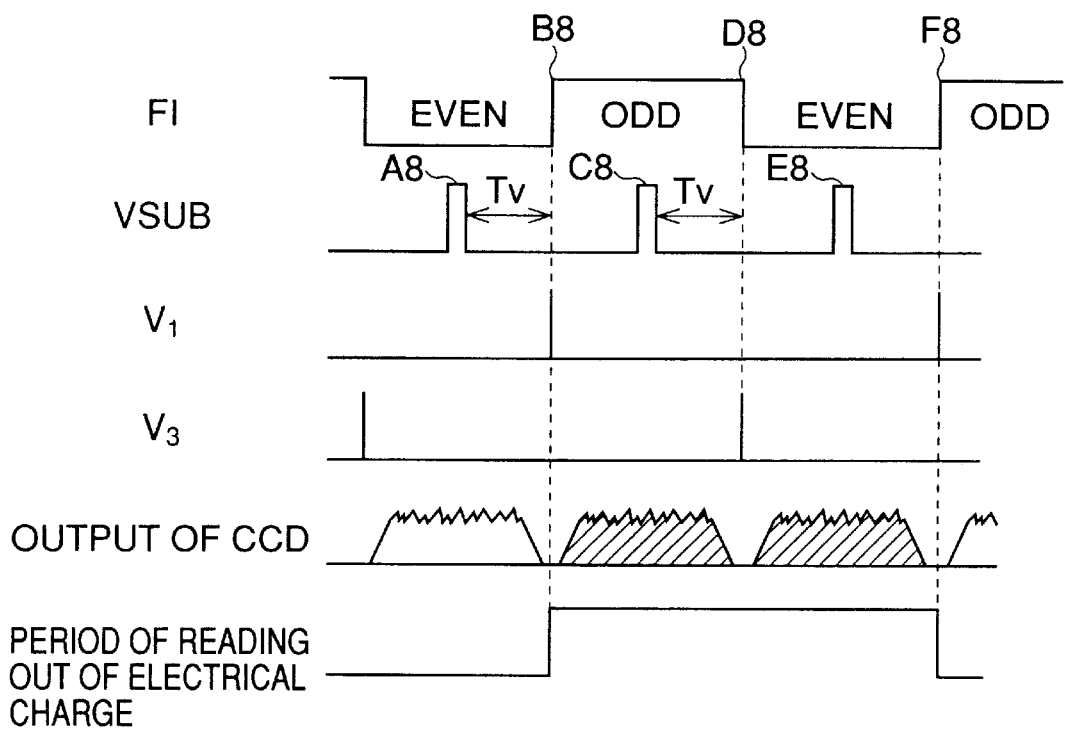

FIG.9

| INPUT SIGNAL OF $P_3$ | INPUT SIGNAL OF $P_1$ | OUTPUT SIGNAL OF $S_3$ | OUTPUT SIGNAL OF $S_4$ |
|---|---|---|---|
| 1 | 1 | 0 | 1 |
| 1 | 0 | 1 | 0 |

TRUTH-TABLE

OPTICAL READER FOR INFORMATION PATTERN REPRESENTING CODED DATA

BACKGROUND OF THE INVENTION

1. Field of the Invention

The present invention relates to an optical reader for optically reading an information pattern representing coded data and, more specifically, to an optical reader suitable for reading a two-dimensional information pattern representing coded data.

2. Description of the Related Art

Recently, a tessellated two-dimensional information pattern representing coded data having black zones and white zones two-dimensionally arranged to represent the coded data, has been proposed. Further, an optical reader for reading and decoding the coded data from the tessellated information pattern has been developed. The optical reader is frequently constituted as a hand held-type reader comprising a reading head including a hollow box-like hand casing having an opening formed in a bottom wall to define a reading area. The reading head also includes a two-dimensional CCD (charge coupled device) image sensor associated with an image formation lens, assembled in the interior of the head casing. The reading head further includes a light source, also incorporated in the interior of the head casing, which illuminates the reading area defined by the opening of the head casing.

For example, when a two-dimensional information pattern is recorded on an article, the optical reader is placed relative to the article such that the information pattern is encompassed by the reading area of the reading head thereof. Then, the information pattern is illuminated by the light source, and an image of the pattern is focused on a light receiving surface of the image sensor by the image formation lens. The focused image is thereby converted into image signals by the image sensor. The image signals, having been read out from the image sensor, are processed and converted into digital data. Further processing is then required to enable the digital data to be decoded. Once the decoding process is completed, the optical reader produces a visual indication or audio indication. Thus, a user can recognize that the optical reading of the information pattern concerned has been properly carried out. Note, if necessary, the decoded data is transmitted to, for example, a host computer which is in communication with the optical reader.

Before the proper optical reading of the two-dimensional information pattern by the image sensor can be completed, the reading head of the optical reader must be properly positioned, with respect to the article. In other words, the information pattern must be completely encompassed by the reading area of the recording head. Also, the reading area must be uniformly illuminated for a predetermined time.

However, even if the reading head is properly aligned, the reading head may not be sufficiently stationary, for example, the hand of the user may be trembling. Accordingly, the image of the two dimensional information pattern is not properly focused on the light receiving surface of the image sensor and, therefore, the optical reading of the pattern can not be completed.

SUMMARY OF THE INVENTION

Therefore, an object of the present invention is to provide an optical reader for optically reading an information pattern representing coded data, wherein optical reading can be carried out successfully.

According to the present invention, there is provided an optical reader for optically reading an information pattern representing coded data. The reader comprises a casing, a sensor, an imaging device, and a photographing controller. The casing has an opening enclosed by a frame portion. The opening defines a reading area. The frame portion is placed onto a surface where the information pattern is provided so that the information pattern is optically read. The sensor senses a trembling speed of the casing. The imaging device converts an image of the reading area to an electric signal to accumulate an electrical charge corresponding to the electric signal. The photographing controller controls an electric charge accumulating time of the imaging device. The sensor is an angular speed sensor. The photographing controller sequentially changes the electric charge accumulating time in accordance with the trembling speed of the casing.

The optical reader further comprises a flush memory, in which the digital value of the electric charge accumulating time, in accordance with the trembling speed of the casing, is stored as table data. The photographing controller determines the electric charge accumulating time by referring to the digital value in the flush memory in accordance with the trembling speed sensed by the sensor.

The imaging device has a plurality of two dimensionally arranged pixels. The electric charge is accumulated in each of the pixels. The photographing controller selects a reading mode, in which the electrical charge is read out from the plurality of pixels, in accordance with the trembling speed.

The photographing controller selects either a frame mode or a field mode. In the frame mode, the electric charge is independently read out from each of the pixels when the value of the trembling speed is lower than a predetermined value. In the field mode, the electric charge of the pixels, which are placed next to each other, are added before being read out when the value of the trembling speed is equal to or higher than a predetermined value.

When the sensor has substantially sensed the trembling speed, the photographing controller can set the electric charge accumulating time as one of two periods. The electric charge accumulating time is set as a first accumulating time or a second accumulating time which is longer than the first accumulating time. The photographing controller accumulates the electric charge in the imaging device for the first accumulating time when the sensor senses a first trembling speed. The photographing controller accumulates the electric charge in the imaging device for the second accumulating time when the sensor senses a second trembling speed which is lower than the first trembling speed.

The optical reader is constituted as a hand held-type reader. Further, according to the present invention, there is provided an optical reader for optically reading an information pattern representing coded data. The reader comprises a casing, a sensor, a light source, and an imaging device. The casing has an opening enclosed by a frame portion. The opening defines a reading area. The frame portion is placed onto a surface where the information pattern is provided, so that the information pattern is optically read. The sensor senses a trembling speed of the casing. The light source emits light to illuminate the surface. The imaging device converts an image of the reading area to an electric signal to accumulate electrical charge corresponding to the electric signal. An electric charge accumulating time and a luminance intensity of the light source are controlled in accordance with the trembling speed of the casing sensed by the sensor.

The electric charge accumulating time is set to a first accumulating time and the luminance intensity is set to a first intensity when the trembling speed is fast. The electric charge accumulating time is set to a second accumulating time and the luminance intensity is set to a second intensity when the trembling speed is low. The first accumulating time is shorter than the second accumulating time, and the first intensity is higher than the second intensity.

Furthermore, according to the present invention, there is provided an optical reader for optically reading an information pattern representing coded data. The reader comprises a casing, a sensor, a light source, and an imaging device. The casing has an opening enclosed by a frame portion. The opening defines a reading area. The frame portion is placed onto a surface where the information pattern is provided, so that the information pattern is optically read. The sensor senses a trembling speed of the casing. The light source emits light to illuminate the surface. The imaging device converts an image of the reading area to an electric signal to accumulate electrical charge corresponding to the electric signal. An electric charge accumulating time and an electric current supplied to the light source are controlled in accordance with the trembling speed of the casing sensed by the sensor.

The electric charge accumulating time is set to a first accumulating time and the electric current is set to a first current value when the trembling speed is fast. The electric charge accumulating time is set to a second accumulating time and the electric current is set to a second current value when the trembling speed is low. The first accumulating time is shorter than the second accumulating time, and the first current value is larger than the second current value.

Furthermore, according to the present invention, there is provided an optical reader for optically reading an information pattern representing coded data. The reader comprises a casing, a sensor, and an imaging device. The casing has an opening enclosed by a frame portion. The opening defines a reading area. The frame portion is placed onto a surface where the information pattern is provided, so that the information pattern is optically read. The sensor senses a trembling speed of the casing. The imaging device converts an image of the reading area to an electric signal to accumulate electrical charge corresponding to the electric signal. The imaging device has a plurality of two dimensionally arranged pixels. An electric charge is accumulated in each of the pixels. The electric charge is read out from the imaging device in either a frame mode or a field mode. In the frame mode the electric charge is independently read out from each of the pixels when there is a minor possibility of the casing trembling. In the field mode, the electric charge of the pixels which are placed next to each other are added before being read out when there is a major possibility of the casing trembling.

The optical reader further comprises a light source that emits light to illuminate the surface. An electric charge accumulating time and a luminance intensity of the light source are variable, in accordance with the trembling speed, when the electric charge is read out in the field mode. The electric charge accumulating time and the luminance intensity are fixed when the electric charge is read out in the frame mode.

Furthermore, according to the present invention, there is provided an optical reader for optically reading an information pattern representing coded data, the reader comprising a casing and a sensor. The casing has an opening enclosed by a frame portion. The opening defines a reading area. The frame portion is placed onto a surface where the information pattern is provided, so that the information pattern is optically read. The sensor senses a trembling speed of the casing. The optical reading is controlled in accordance with the trembling speed.

BRIEF DESCRIPTION OF THE DRAWINGS

The present invention will be better understood from the description of the preferred embodiments of the invention set forth below, together with the accompanying drawings, in which:

FIG. 7 is a timing chart showing how the electrical charge of each of the photodiodes is read out in a field mode;

FIG. 8 is a timing chart showing how the electrical charge of each of the photodiodes is read out in a frame mode;

FIG. 9 is a truth-table of the first embodiment of an optical reader of the present invention;

DESCRIPTION OF THE PREFERRED EMBODIMENTS

Figure 1:
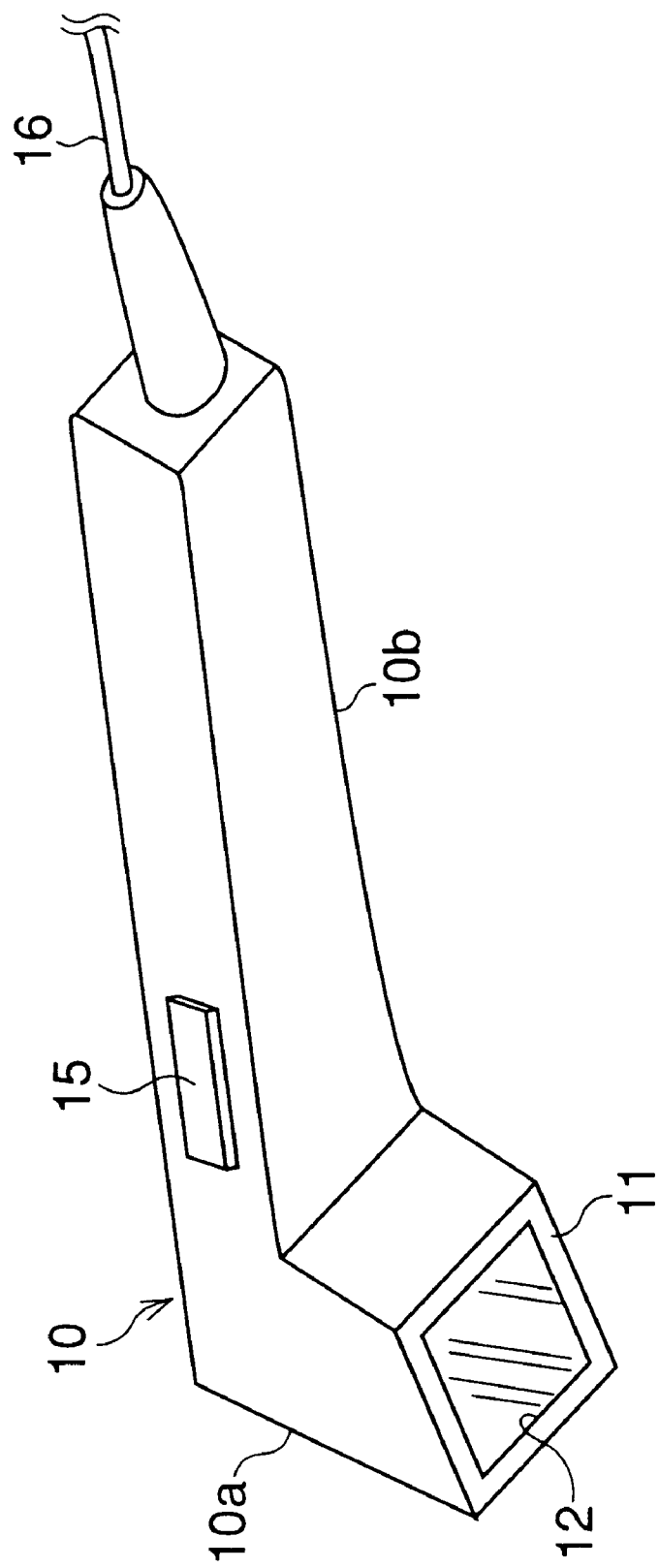
FIG. 1 is a perspective view showing an optical reader for reading an information pattern according to a first embodiment of the present invention.

The present invention will now be described with reference to the embodiments shown in the drawings.

Note, in this specification, a "symbol" is an information pattern representing coded data, a "symbol surface" is a surface on which the symbol is formed, and "symbol data" is coded data which is represented by the symbol.

FIG. 1 shows an optical reader of the first embodiment according to the present invention. A casing 10 of an optical reader comprises a reading head 10a and a handle 10b. The reading head 10a includes a frame portion 11 having a parallelogram-shaped bottom opening 12. A trigger switch 15 is provided on the side wall of the handle 10b, which commences the optical reading. A cable 16, which transmits signals output from the optical reader 10 to any host computer (not shown), is connected opposite the reading head 10a.

Figure 2:
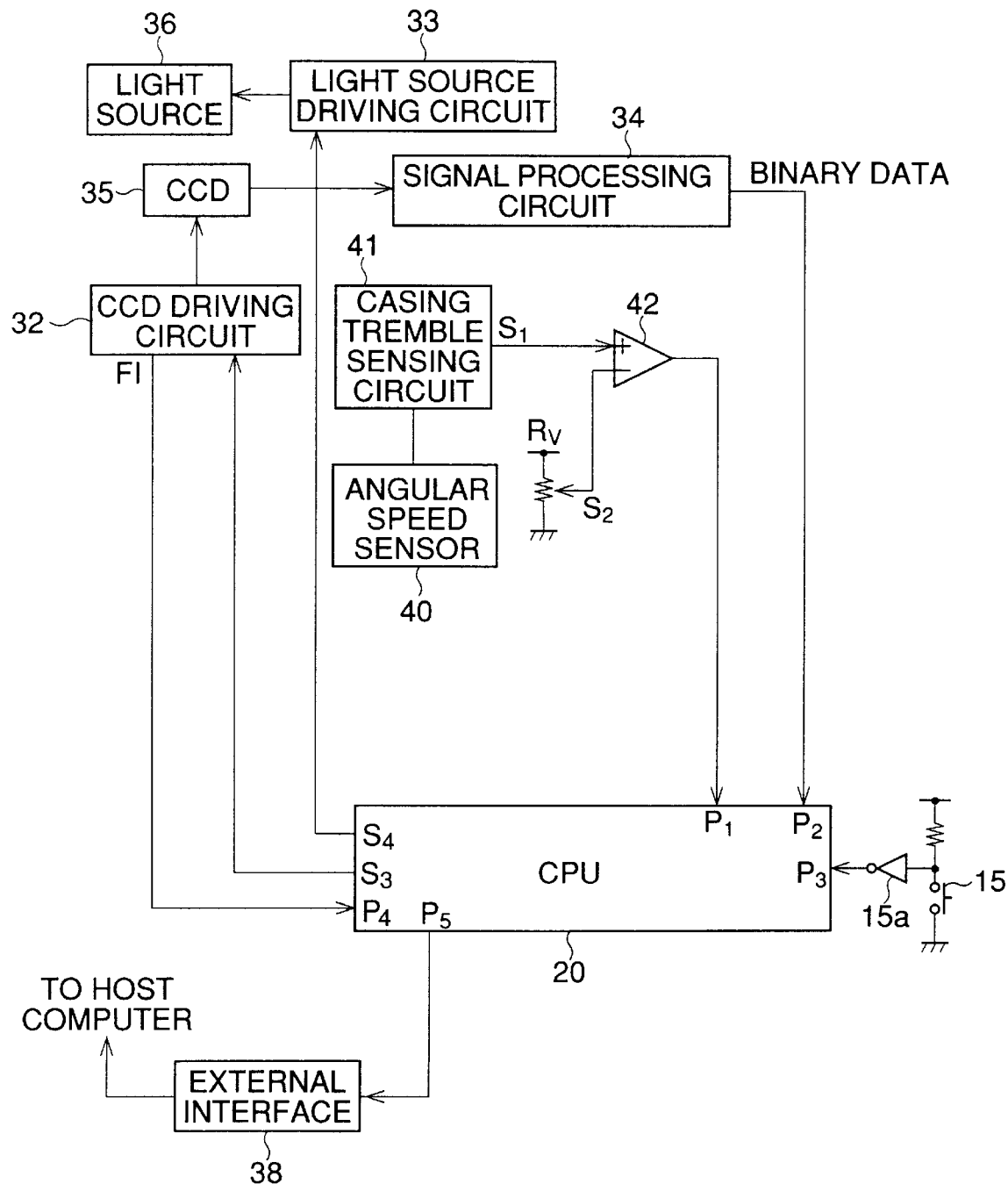
FIG. 2 is a block diagram of an optical reader of the first embodiment.

FIG. 2 is a block diagram of the optical reader of the first embodiment according to the present invention, in which a CPU 20 controls the optical reader as a whole. The trigger switch 15 is connected to an inverter 15a. When the trigger switch 15 is pressed, a high signal "1" is output from the inverter 15a. When the trigger switch 15 is not pressed, a low signal "0" is output from the inverter 15a. The signal output from the inverter 15a is input to a port $P_3$ of the CPU 20.

A CCD driving circuit 32, a light source driving circuit 33 and a signal processing circuit 34 are connected to the CPU 20. A signal, which controls the CCD driving circuit 32, is output from a port $S_3$. A signal, which controls the light source driving circuit 33, is output from a port $S_4$.

A voltage corresponding to a trembling speed of the casing 10 is output from an angular speed sensor 40, which is placed close to the CCD 35 in the casing 10. The optical reader of this embodiment is constituted as a hand held-type reader, which a user grasps in his hand. A large element rotates when the casing trembles and is dependent on the extent of the movement of the user's wrist. It is preferable to detect an angular speed of the casing 10 as the trembling of the optical reader occurs. Accordingly, the angular speed sensor 40 is applied to this embodiment. The voltage is input to a casing tremble sensing circuit 41. An analog voltage corresponding to the voltage input from the angular speed sensor 40 is output from the casing tremble sensing circuit 41. The analog voltage is input to a comparator 42. Note, that a conventional sensor made of ceramic, in which a voltage corresponding to a trembling speed is generated, is used as the angular speed sensor 40.

The comparator 42 is an operational amplifier, that is a comparing circuit. The comparator 42 has a positive terminal which is connected to the casing tremble sensing circuit 41 and an inverting terminal which is connected to a volume Rv that is a variable resistance. In the comparator 42, a standard voltage value $S_2$, decided by the volume Rv, is a threshold value. Namely, the comparator 42 compares a voltage value $S_1$, which is output from the casing tremble sensing circuit 41, with the standard voltage value $S_2$. When the voltage value $S_1$ is higher than the standard voltage value $S_2$, the comparator 42 outputs a high signal 1. When the voltage value $S_1$ is lower than the standard voltage value $S_2$, the comparator 42 outputs a low signal "0". The comparator 42 is connected to the CPU 20, so that the output signal of the comparator 42 is input to a port $P_1$.

The output signal of the port $S_4$ is decided in accordance with the input signals of the ports $P_1$ and $P_3$. A light source driving signal is output from the light source driving circuit 33 in accordance with the output signal of the port $S_4$. The luminous intensity of a light source 36 is decided in accordance with the light source driving signal. Consequently, the light source 36 is driven, whereby the light source 36 emits light to a reading area defined by the bottom opening 12 (see FIG. 1) and placed on the symbol surface.

Similarly, the output signal of the port $S_3$ is decided in accordance with the input signals of the ports $P_1$ and $P_3$. The CCD driving circuit 32 is controlled in accordance with the input signal from the port $S_3$, whereby a CCD driving signal is output from the CCD driving circuit 32, so that the CCD 35 is driven.

The light emitted to the reading area by the light source 36 is reflected by the symbol surface and is directed to the CCD 35. An optical image corresponding to the symbol surface is thereby imaged on the surface of the CCD 35, and the optical image is subsequently converted into image data. The image data, that is data of all the pixels of the reading area, is subject to predetermined processes, such as a binarization process and so on, in a signal processing circuit 34, and is then input into a port $P_2$. Synchronization signals, which are a vertical synchronization signal, a horizontal synchronization signal and a field index signal, are output from the CCD driving circuit 32 and are input into a port $P_4$. The synchronization signals are used for extracting symbol data from the image data. The image data input into the port $P_2$ is stored in a memory (not shown) by the CPU 20, in accordance with the synchronization signals input into the port $P_4$.

Further, the image data is read out from the memory, and the symbol data is extracted from the image data in accordance with the synchronization signals (the vertical synchronization signal, the horizontal synchronization signal and the field index signal). The symbol data is subjected to predetermined processes, such as a decoding process and so on, and then is decoded. When the decoding process is carried out successfully, the decoded symbol data is output from a port $P_5$ and is transmitted to a host computer through an external interface 38.

Figure 3:
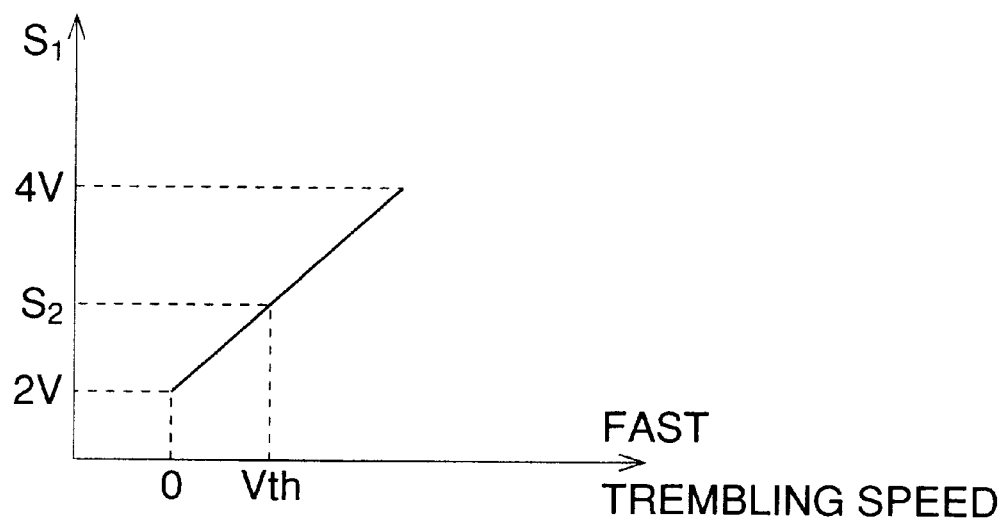
FIG. 3 is a graph showing a relation between an amount of trembling of a casing and an output signal of a casing tremble sensing circuit.

FIG. 3 is a graph showing the relation between a trembling speed of the casing 10 and the output signal $S_1$ of the casing tremble sensing circuit 41. As the trembling speed of the casing 10 becomes higher, the output signal $S_1$ becomes higher. Note, that a minimum value and a maximum value of the output signal $S_1$ is predetermined. In the first embodiment, 2 V is set to the minimum value and 4 V is set to the maximum value. Approximately 2.5 V is set to the standard voltage value $S_2$, which corresponds to Vth of the trembling speed of the casing 10. Namely, the output signal $S_1$ is variable in accordance with the trembling speed of the casing 10 in the range from 2 V to 4 V.

Figure 4:
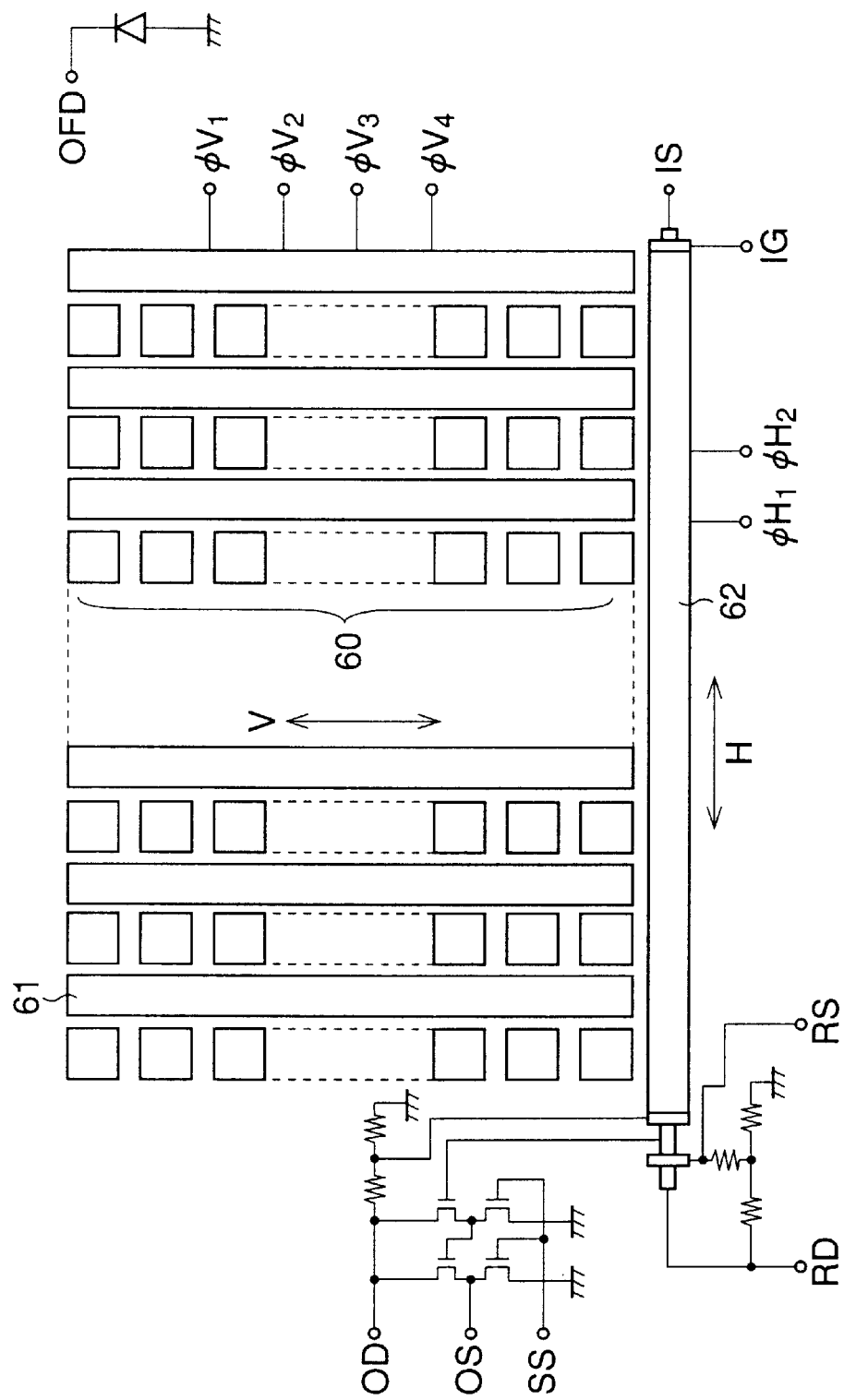
FIG. 4 is a diagrammatic view showing the structure of a conventional CCD used in the first embodiment of an optical reader according to the present invention.

FIG. 4 is a diagrammatic view showing the structure of a conventional CCD used in the first embodiment according to the present invention. Further, the perspective view shown in FIG. 1 and the block diagram shown in FIG. 2, of the first embodiment, are applied to the second embodiment.

Photodiodes 60, corresponding to each of the pixels, are aligned in a plurality of rows in a V direction (vertical direction). The plurality of lines of the photodiodes 60 and the vertical transfer CCDs 61 are arranged alternately in an H direction (horizontal direction). An electrical charge generated at each of the photodiodes 60 is moved to the vertical transfer CCD 61. The electrical charge is transferred from the vertical transfer CCD 61 to the horizontal transfer CCD 62. Thus, the electrical charge is output by terminals connected to the horizontal transfer CCD 62.

Figure 5:
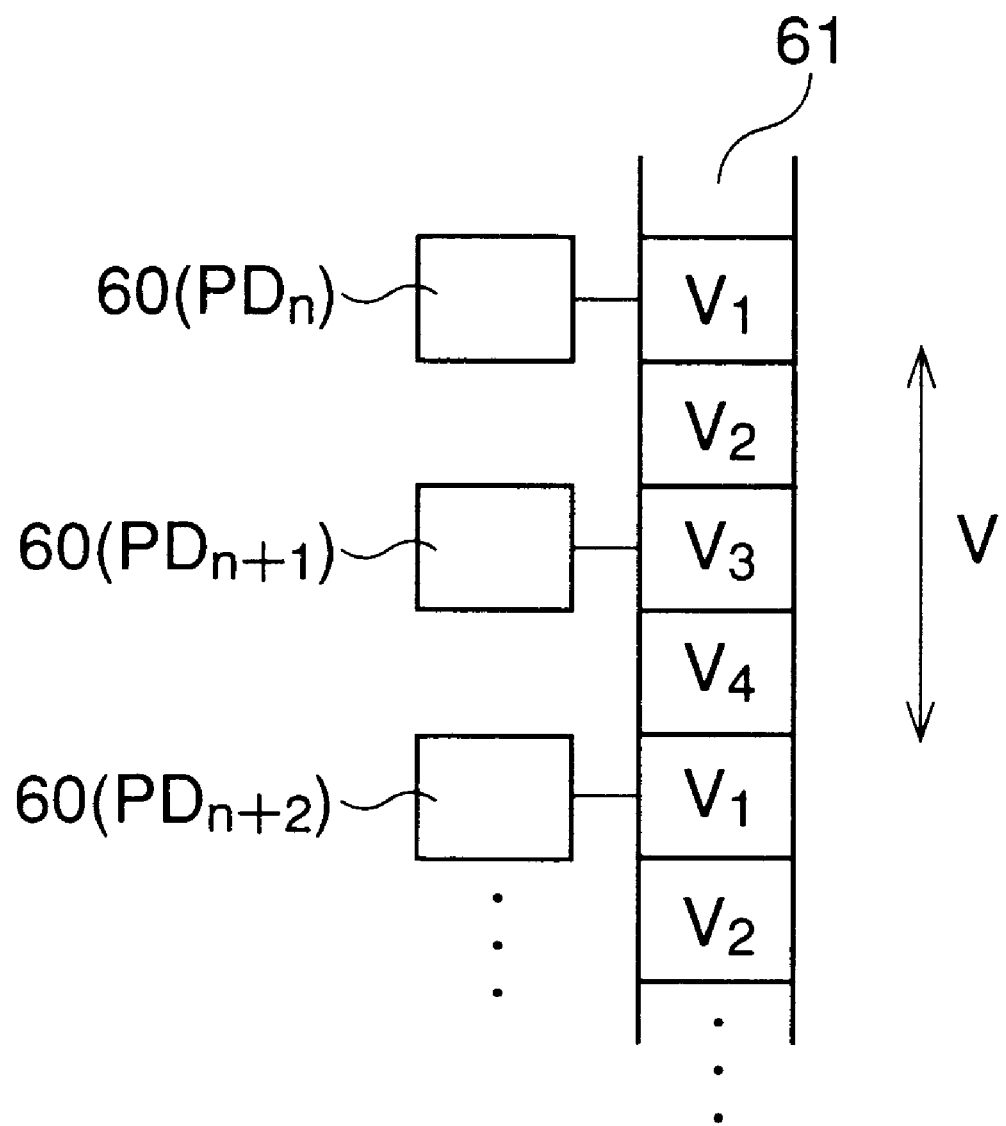
FIG. 5 is an enlarged view showing the structure of photo diodes and a vertical transfer CCD used in the first embodiment of an optical reader according to the present invention.

FIG. 5 is an enlarged view showing the structure of the photodiodes 60 and the vertical transfer CCD 61. The vertical transfer CCD 61 comprises four phase transfer electrodes: $V_1$, $V_2$, $V_3$, $V_4$. The photodiodes 60 are aligned in a V direction (vertical direction), and are connected to the transfer electrodes $V_1$ or $V_3$ alternately. Namely, each of the odd photodiodes ($PD_1$, $PD_3$, $PD_5$ . . . ) are respectively connected to each of the transfer electrodes $V_1$. Each of the even photodiodes ($PD_2$, $PD_4$, $PD_6$ . . . ) are respectively connected to each of the transfer electrodes $V_3$. When a voltage is applied to the transfer electrode, electrical charge accumulated on the transfer electrode is moved to the vertical transfer CCD 61. The odd photodiodes correspond to odd fields of an image, and the even photodiodes correspond to even fields of the image.

Figure 6:
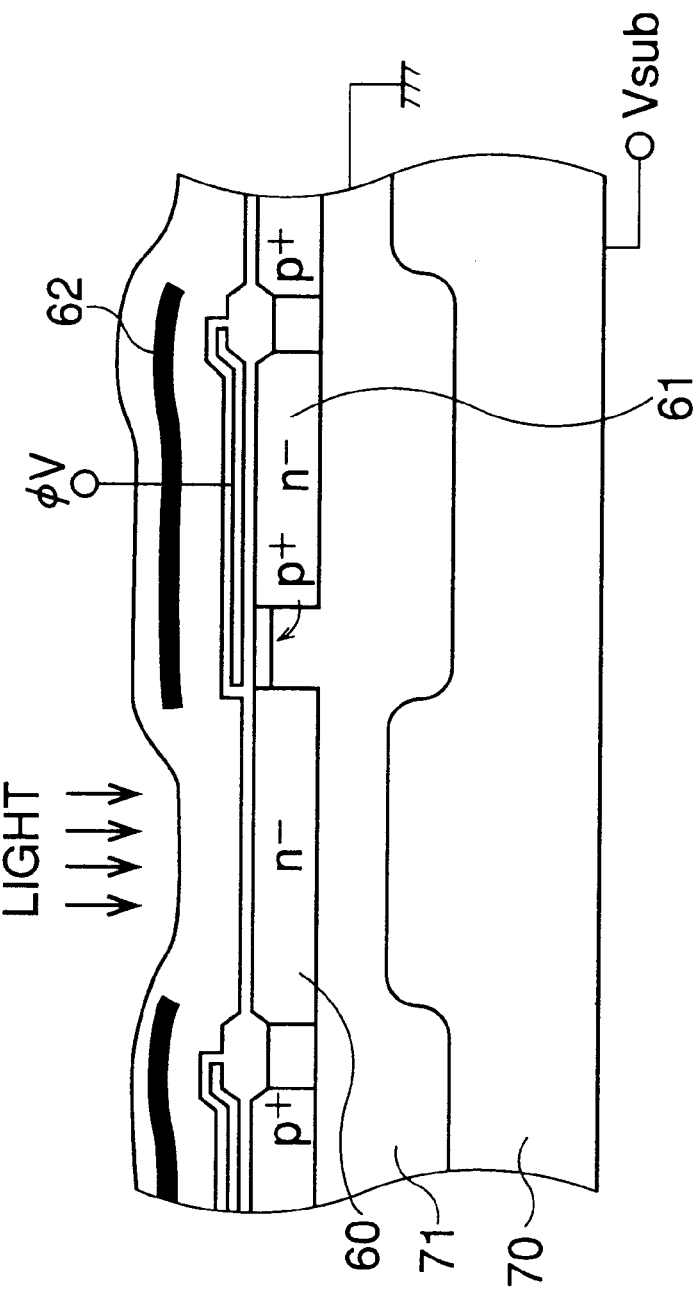
FIG. 6 is a sectional view of an imaging device used in the first embodiment of an optical reader according to the present invention.

FIG. 6 is a sectional view of an imaging device applied in the first embodiment. A pulse for transferring electrical charge is applied to a transfer electrode ØV. A p-type silicon substrate 71 is laminated on an n-type silicon substrate 70. The photodiode 60 (n-type) is provided on the p-type silicon substrate 71. The vertical transfer CCD 61 is formed adjacent to the photodiode 60, and is protected from light by a shield member 62 made of aluminum. By applying a voltage of a few tens of volts (Vsub), a residual electrical charge remaining in the photodiode 60 is moved to the side of the substrates, and is removed from the imaging device.

Next, a control of the time in which the electrical charge is accumulated in the photodiode 60 will be explained. While the voltage Vsub is being applied to the n-type silicon substrate 70, the residual electrical charge is being removed from the photodiode 60. When application of the voltage Vsub is stopped, accumulation of electrical charge in the photodiode 60 is started. After a predetermined time has passed, a TG pulse, which is a pulse signal for transferring electrical charge, is applied to the electrodes $V_1$ and $V_3$. Thus, electrical charge, which is accumulated in the photodiode 60, is transferred to the electrode of the vertical transfer CCD 61. Therefore, the time, in which electrical charge is accumulated in the photodiode 60 can be freely regulated by controlling the time of application of the voltage Vsub to the n-type silicon substrate.

Accordingly, by setting the time in which the electrical charge is accumulated in the photodiode 60, in accordance with the degree of trembling of the casing 10, the reliability of the imaging data becomes higher. Namely, when the casing 10 is trembling hard, the electric charge accumulating time may be set short. Conversely, when the casing 10 is trembling slightly, the electric charge accumulating time may be set long. The time in which the electrical charge is accumulated is referred to as "electrical shutter speed" hereinafter.

FIG. 7 is a timing chart showing how the electrical charge of each of the photodiodes is read out in a field mode. FIG. 8 is a timing chart showing how the electrical charge of each of the photodiodes is read out in a frame mode. In FIGS. 7 and 8, FI is a field index signal which is output from the CCD driving circuit 32. A high level FI corresponds to the odd field of the image data, and a low level FI corresponds to the even field of the image data.

In FIG. 7, at A7, the substrate voltage Vsub is applied to the n-type substrate 70 so that the residual electrical charge is removed from each of the photodiodes 60 (see FIG. 5). After that, the accumulation of the electrical charge is started in each of the photodiodes 60. At B7, a predetermined voltage is applied to each of the electrodes $V_1$ and $V_3$ of the vertical transfer CCD 61. Thus, the electrical charge corresponding to each of the odd and the even fields, which is accumulated in each of the photodiodes 60, is transferred to the vertical transfer CCD 61. In the vertical transfer CCD 61, the electrical charge accumulated in each of the photodiodes 60 which are placed at odd positions, counted from the horizontal transfer CCD 62, and the electrical charge accumulated in the photodiodes 60 which are placed at even positions, counted from the horizontal transfer CCD 62, and which are placed at a lower side of the odd photodiodes 60 (namely $PD_1$ and $PD_2$, $PD_3$ and $PD_4$ . . . ), are added. The added electrical charge is transferred to the horizontal transfer CCD 62. From B7 to D7, the added electrical charge is then output from the horizontal transfer CCD 62 so that the electrical charge corresponding to one field of the image data is read out.

At C7, the substrate voltage Vsub is applied to the n-type substrate 70, again, and the residual electrical charge is removed from the photodiodes 60. At D7, similarly to B7, a predetermined voltage is applied to each of electrodes $V_1$ and $V_3$, of the vertical transfer CCD 61. Thus, the electrical charge corresponding to each of the odd and even fields, which is accumulated in each of the photodiodes 60, is transferred to the vertical transfer CCD 61. In the vertical transfer CCD 61, the electrical charge accumulated in each of the photodiodes 60 which are placed at odd positions, counted from the horizontal transfer CCD 62, and the electrical charge accumulated in the photodiodes 60 which are placed at even positions, counted from the horizontal transfer CCD 62, and which are placed at an upper side of the odd photodiodes 60 (namely $PD_2$ and $PD_3$, $PD_4$ and PD . . . ), are added. The added electrical charge is then transferred to the horizontal transfer CCD 62. Similarly, from D7 to E7, the added electrical charge is output from the horizontal transfer CCD 62 so that the electrical charge corresponding to one field of the image data is read out.

In FIG. 8, at A8, the substrate voltage Vsub is applied to the n-type substrate 70 so that the residual electrical charge is removed from each of the photodiodes 60. After that, the accumulation of the electrical charge is started in each of the photodiodes 60. At B8, a predetermined voltage is applied to each of the electrodes $V_1$, of the vertical transfer CCD 61. Thus the electrical charge corresponding to each of the odd fields of the image data, which is accumulated in each of the photodiodes 60, is transferred to the vertical transfer CCD 61 and is then transferred to the horizontal transfer CCD 62. At the same time, the FI is changed to a high level, which indicates an odd field. From B8 to D8, the electrical charge is output from the horizontal transfer CCD 62 to be read out as an odd field of the image data.

Further, at C8, the substrate voltage Vsub is applied to the n-type substrate 70, again, and the residual electrical charge is removed from each of the photodiodes 60. At D8, a predetermined voltage is applied to each of the electrodes $V_3$, of the vertical transfer CCD 61. Thus, whereby the electrical charge corresponding to each of the even fields, which is accumulated in each of the photodiodes 60, is transferred to the vertical transfer CCD 61 and is then transferred to the horizontal transfer CCD 62. At the same time, the FI is changed to a low level, which indicates an even field. From D8 to F8, the electrical charge is output from the horizontal transfer CCD 62 to be read out as an even field of the image data.

Accordingly, the reading out mode of the electrical charge corresponding to the image data can be changed from field mode to frame mode, or from frame mode to field mode, by controlling the phase of the voltage being applied to the electrodes $V_1$ and $V_3$. Note, that in the first embodiment, the reading out mode is fixed to the field mode in order to make the structure of processing simple.

FIG. 9 is a truth-table of the first embodiment, showing the relation between the input signals of the port $P_1$ and $P_3$ and the output signals of the port $S_3$ and $S_4$. The value of the electric shutter speed (the electric charge accumulating time) is decided in accordance with the output signal of the port $S_3$. An electric current supplied to the light source 36 is decided in accordance with the output signal of the port $S_4$.

The first line of the truth-table shows the input signal of the port $P_3$ is "1". In other words, the trigger switch 15 is pressed, and the input signal of the port $P_1$ is "1", namely the trembling speed of the casing 10 is fast. In this case, the output signal of the port $S_3$ is "0", which indicates that the electric shutter speed is set high (the electric charge accumulating time is set short), and the output signal of the port $S_4$ is "1", which indicates that the electric current supplied to the light source 36 is high. Thus, the luminance intensity of the light emitted from the light source 36 is high.

The second line of the truth-table shows the input signal of the port $P_3$ is "1", namely the trigger switch 15 is pressed, and the input signal of the port $P_1$ is "0". In other words, the trembling speed of the casing 10 is slow. In this case, the output signal of the port S₃ is "1", which indicates that the electric shutter speed is set low (the electric charge accumulating time is set long), and the output signal of the port S₄ is "0", which indicates that the electric current supplied to the light source 36 is low. Thus, the luminance intensity of the light emitted from the light source 36 is low.

Figure 10:
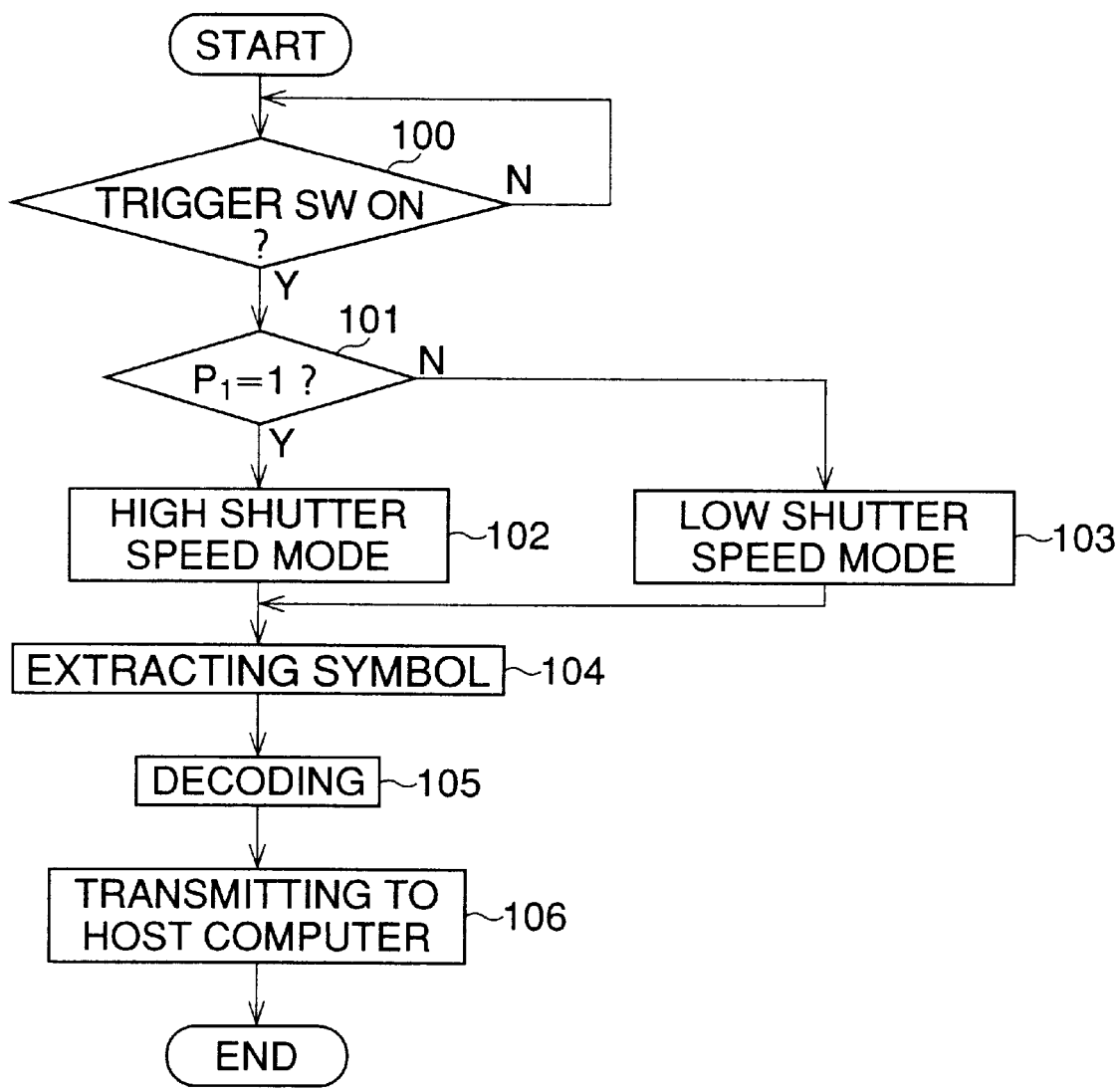
FIG. 10 is a flow chart of the optical reading of the first embodiment.

FIG. 10 is a flow chart which shows the process from the imaging of the reading area to the transmitting of the decoded symbol data in the first embodiment. In the flow chart, a "high shutter speed mode" and a "low shutter speed model" mean a mode in which the symbol surface is imaged. For example, in the high shutter speed mode, the electrical charge according to the image data of the reading area is accumulated in the photodiodes 60 for ¹⁄₁₀₀₀ sec, and an electric current of 40 mA is supplied to the light source 36 so that the luminance intensity of the light source 36 is high. In the low shutter speed mode, the electrical charge according to the image data of the reading area is accumulated in the photodiodes 60 for ¹⁄₂₅₀ sec, and an electric current of 10 mA is supplied to the light source 36 so that the luminance intensity of the light source 36 is low.

When the imaging of the reading area starts, the main power of the optical reader is on, and the CPU 20 is operational. The CCD driving circuit 32, the light source driving circuit 33, the signal processing circuit 34, the casing tremble sensing circuit 41, the CCD 35, and the light source 36 are ready to be driven. In step 100, it is judged whether the trigger switch 15 is pressed. If the trigger switch 15 is pressed, the process proceeds to step 101. If the trigger switch 15 is not pressed, the process does not proceed to any other step. Namely, the optical reading of the symbol is started by pressing the trigger switch 15.

In step 101, it is judged whether the signal which is input to the port P₁ is "1". If the signal is "1", namely, the trembling speed of the casing 10 is fast, the process proceeds to step 102. In step 102, the high shutter speed mode is selected. The reading area is imaged in the high shutter speed mode, and the image data of the symbol surface is read out from the CCD 35. The image data is subjected to the predetermined processes, such as the binarization process and so on, and is stored in the memory. Then, the process proceeds to step 104.

On the other hand, if the signal input to the port P₁ is "0", namely, the trembling speed of the casing 10 is low, the process proceeds to step 103. In step 103, the low shutter speed mode is selected. The reading area is imaged in the low shutter speed mode, and the image data of the symbol surface is read out from the CCD 35. The image data is subjected to the predetermined processes, such as the binarization process and so on, and is stored in the memory. Then, the process proceeds to step 104.

In step 104, the extracting process is carried out. Namely, the information of all the pixels of the image data is read out, and the information of the pixels corresponding to the symbol is extracted from the information of all the pixels of the image data. In step 105, the information of the pixels corresponding to the symbol is decoded. If the decoding process is carried out successfully, the decoded data of the symbol is transmitted to the host computer in step 106. If the decoding process is not carried out successfully, the transmission to the host computer is not carried out. A user is informed of the result of the decoding process by a buzzer or by an indicating lamp (not shown) provided on the casing 10.

As described above, in the first embodiment, the electric charge accumulating time is decided in accordance with the trembling speed of the casing 10 sensed by the angular speed sensor 40. Accordingly, the symbol surface can be more accurately imaged. Also, the possibility of failing to decode the symbol data extracted from the image data of the reading area is lowered and the probability of success of the optical reading becomes higher.

Figure 11:
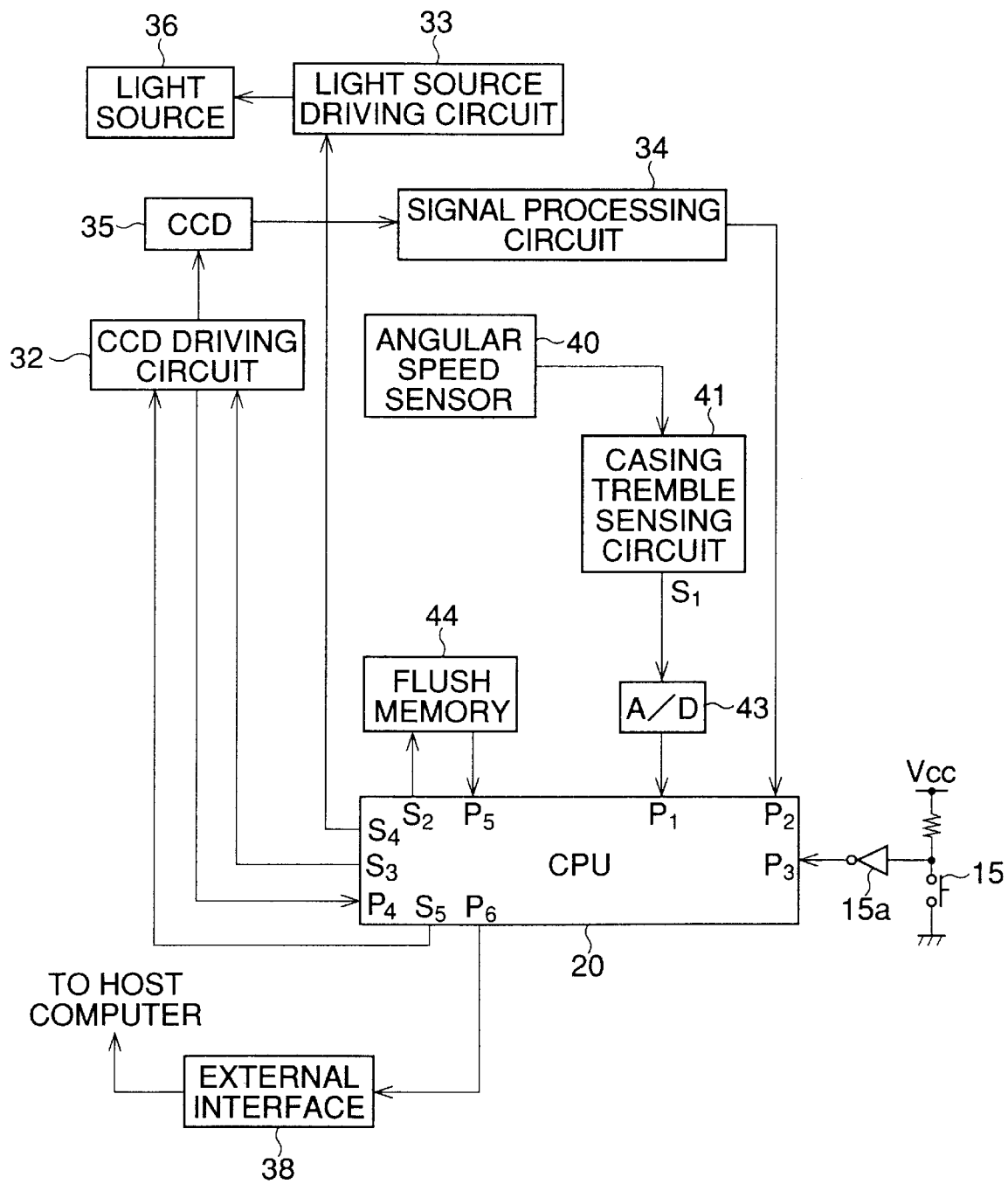
FIG. 11 is a block diagram of an optical reader according to a second embodiment.

Further, in the first embodiment, when the electric charge accumulating time is long, the luminance intensity of the light source 36 is low. Accordingly, the consumption of electrical current supplied to the light source 36 is economized FIG. 11 is a block diagram of an optical reader according to the second embodiment. Similar to the first embodiment, a voltage corresponding to the trembling speed of the casing 10 is output from an angular speed sensor 40, which is placed close to a CCD 35 in the casing 10. The voltage is input to a casing tremble sensing circuit 41. An analog voltage S₁, corresponding to the voltage input from the angular speed sensor 40, is output from the casing tremble sensing circuit 41. The analog voltage S₁ is input to an A/D converter 43. The A/D converter 43 is connected to the CPU 20. In the A/D converter 43, the analog voltage S₁ is converted to a digital signal of 8 bits. The digital signal is output from the A/D converter 43 and is input to a port P₁ of the CPU 20.

The relation between a trembling speed of the casing 10 and the output signal S₁ is similar to that of the first embodiment. Namely, when the angular speed sensor 40 does not sense the trembling of the casing 10, the analog voltage S₁ output from the casing tremble sensing circuit 41 is 2 V (see FIG. 3).

A CCD driving circuit 32 is connected to the CPU 20 through a port S₃ and a port S₅. Similar to the first embodiment, a signal which controls the CCD driving circuit 32 is output from the port S₃. The output signal of the port S₅ is decided in accordance with whether or not the input signal of the port P₁ is greater than a predetermined value (a digital value of 2 V). The CCD driving circuit 32 selects the frame mode or the field mode, with respect to the output signal of the port S₅, and drives the CCD 35 accordingly. Namely, when the input signal of the port P₁ does not reach the predetermined value, the output signal, which indicates the reading out of the electric charge from the CCD 35 in the frame mode, is output from the port S₅; when the input signal of the port P₁ reaches or is over the predetermined value, the output signal which indicates the reading out of the electric charge from the CCD 35 in the field mode is output from the port S₅.

Further, a flush memory 44 is connected to the CPU 20. In the flush memory 44, digital values are stored as table data. The digital values are of the digital signal and are input to the port P₁, by which the digital value of the electric charge accumulating time corresponding to the output signal from the angular speed sensor 40 is decided and the digital value of the voltage, which regulates the luminance intensity of the light source 36, is decided. The digital signal, input to the port P₁, is output from the port S₂, and the table data stored in the flush memory 44 is referred to in accordance with the output signal of the port S₂. Thus, the digital value of the electric charge accumulating time and the digital value of the voltage which decides the luminance intensity of the light source 36, are given. The digital values are input to the CPU 20 through the port P₅. The digital value of the electric charge accumulating time is output from the port S₃ to the CCD driving circuit 32. The digital value of the voltage which decides the luminance intensity of the light source 36 is output from the port $S_4$ to the light source driving circuit 33. Other elements are similar to the first embodiment.

Figure 12:
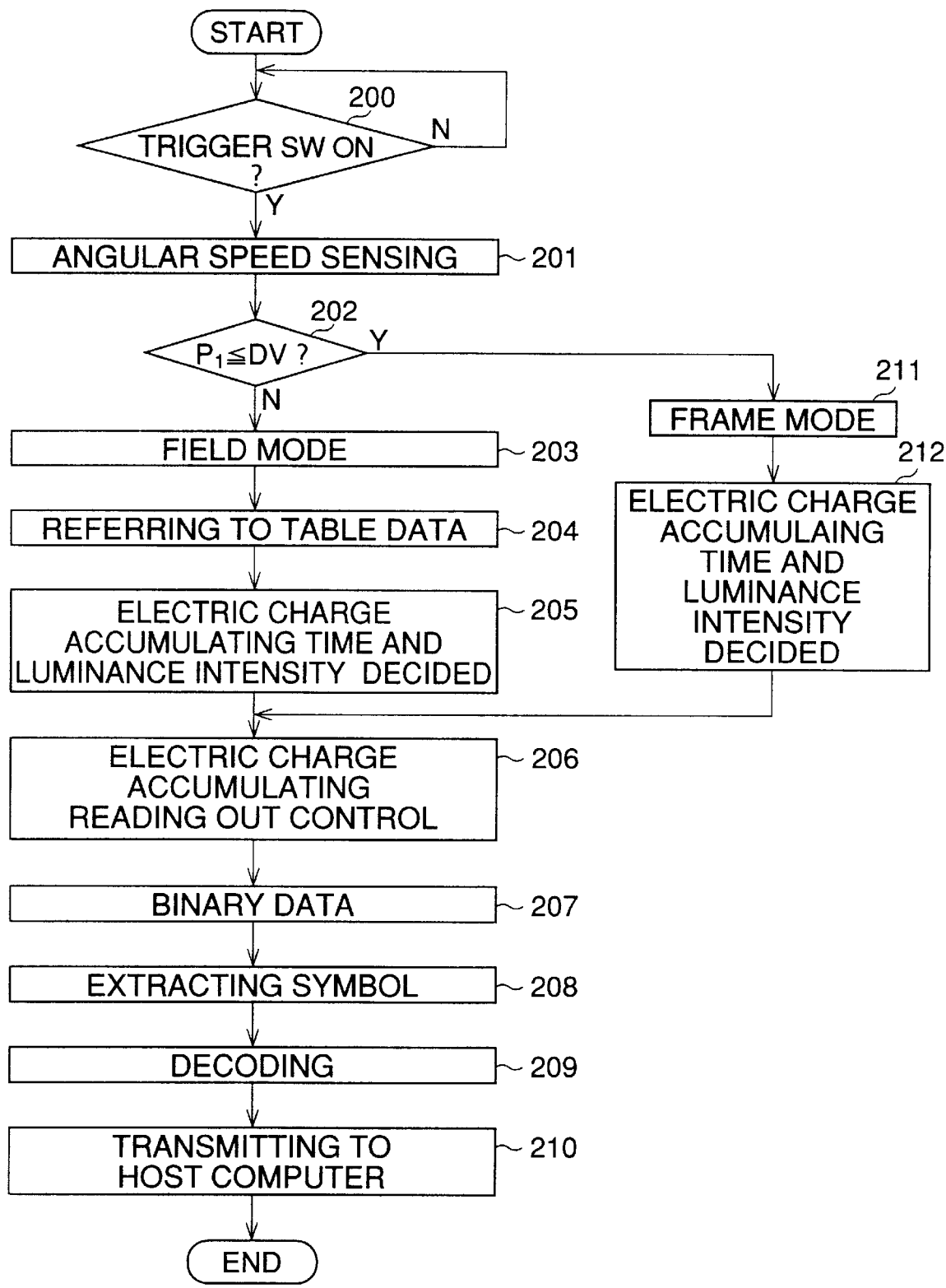
FIG. 12 is a flow chart of the optical reading of the second embodiment.

FIG. 12 is a flow chart which shows the process from the imaging of the reading area to the transmitting of the decoded symbol data in the second embodiment. In the flow chart, DV is a converted digital value of the analog voltage of 2 V. As described above, the voltage of 2 V is output from the casing tremble sensing circuit 41 when the angular speed sensor 40 does not sense trembling of the casing 10.

When the imaging of the reading area starts, the main power of the optical reader is on, and the CPU 20 is operational. The CCD driving circuit 32, the light source driving circuit 33, the signal processing circuit 34, the casing tremble sensing circuit 41, the CCD 35, and the light source 36 are ready to be driven. In step 200, it is judged whether the trigger switch 15 is pressed. If the trigger switch 15 is pressed, the process proceeds to step 201. If the trigger switch 15 is not pressed, the process does not proceed to any other step. Namely, the optical reading of the symbol is started by pressing the trigger switch 15.

In step 201, a signal corresponding to the trembling speed of the casing 10 is outputted from the angular speed sensor 40 to the casing tremble sensing circuit 41. An analog voltage value, corresponding to the signal output from the angular speed sensor 40, is output from the casing tremble sensing circuit 41, and is converted to a digital value by the A/D converter 43 to be input to the port $P_1$ of the CPU 20.

In step 202, the digital value input to the port $P_1$ is compared with the DV. When the digital value is higher than the DV, namely when the casing 10 is trembling, the process proceeds to step 203. When the digital value is equal to or lower than the DV, namely when the casing 10 is not trembling, the process proceeds to step 211.

In step 203, a signal output from the port $S_5$ is "0", so that the field mode is set to the mode in which the electric charge is read out from the imaging device.

In step 204, the digital value inputted to the port $P_1$ is outputted from the port $S_2$ to the flush memory 44, and the table data, stored in the flush memory 44, is referred to in accordance with the output signal of the port $S_2$. In step 205, the digital value of the electric charge accumulating time and the digital value of the voltage which decides the luminance intensity of the light source 36, are given.

In step 206, the signal corresponding to the digital value of the electric charge accumulating time is output from the port $S_3$ to the CCD driving circuit 32, and the signal corresponding to the digital value of the voltage which decides the luminance intensity of the light source 36 is output from the port $S_4$ to the light source driving circuit 33. The symbol surface is imaged in a predetermined electric charge accumulating time, corresponding to the digital value output from the port $S_3$, and in a predetermined luminance intensity, corresponding to the digital value output from the port $S_4$.

In step 207, the image data is subject to the predetermined processes, such as the binarization process and so on, and is stored in the memory. Then, the process proceeds to step 208. In step 208, the extracting process is carried out. Namely, the information of all the pixels of the image data is read out from the memory, and the information of the pixels, corresponding to the symbol, is extracted from the information of all the pixels of the image data. In step 209, the information of the pixels corresponding to the symbol is decoded.

If the decoding process is carried out successfully in step 209, the decoded data of the symbol is transmitted to the host computer in step 210. If the decoding process is not carried out successfully in step 209, the transmission to the host computer is not carried out. A user is informed of the result of the decoding process by a buzzer or by an indicating lamp (not shown) provided on the casing 10.

On the other hand, in step 211, a signal output from the port $S_5$ is "1", so that the frame mode is set to the mode in which the electric charge is read out from the imaging device.

In step 212, in accordance with the frame mode, the electric current supplied to the light source 36 is set as 20 mA, and the electric charge accumulating time is set as 1/200 sec. Then, the process proceeds to step 206. In step 206, the symbol surface is imaged in the luminance intensity corresponding to the supplied electric current, set in step 212, and in the electric charge accumulating time, also set in step 212. The processes from step 207 to step 210 are similar to those of the field mode.

As described above, when there is a minor possibility of the casing 10 trembling, the electric charge is read out from the CCD 35 in the frame mode. When there is a major possibility of the casing 10 trembling, the electric charge is read out from the CCD 35 in the field mode. Further, in the field mode, the electric charge accumulating time and the luminance intensity are variable in accordance with the trembling speed of the casing 10.

In the field mode, the quantity of the information of the image data is half of that of the frame mode, because the electrical charge of the even fields and the electrical charge of the odd fields are subjected to addition. However, the field mode is effective when there is a possibility of the casing 10 trembling, because the imaging time (from the beginning of the accumulation of the electrical charge to the end of the reading out of the electrical charge of all the pixels of the image data) of the field mode is half that of the frame mode.

In the frame mode, the imaging time is twice that of the field mode. Namely, the reading out in the frame mode is easily affected by the trembling of the casing 10. Accordingly, when reading out of the image data is carried out in the frame mode, the opening should be directly positioned over the symbol surface for a time longer than that of the field mode. Also, the reading out in the frame mode is easily affected by the trembling of the casing 10. On the other hand, high accuracy when decoding the symbol data can be obtained because the quantity of the information of the image data, which is read out, is larger than that of the field mode.

According to the second embodiment, the image data of the symbol surface can be obtained in a proper condition, in accordance with the degree of the trembling speed of the casing 10. Also, the accuracy of the image data is always kept high so that the decoding process can be successfully carried out.

The present disclosure relates to subject matter contained in Japanese Patent Application No.8-248594 (filed on Aug. 30, 1996) which is expressly incorporated herein, by reference, in its entirety.

We claim:

1. An optical reader for optically reading an information pattern representing coded data, comprising:

a casing having an opening enclosed by a frame portion, said opening defining a reading area, said frame portion being positionable on a surface where said information pattern is provided, so that said information pattern is optically read;

a sensor that senses a trembling speed of said casing;

an image device which converts an image of said reading area to an electric signal to accumulate an electrical charge corresponding to said electric signal;

a photographing controller that controls an electric charge accumulating time of said imaging device; and said photographing controller setting said electric charge accumulating time as one of two periods, when said sensor has substantially sensed said trembling speed.

2. The optical reader according to claim 1, wherein said sensor is an angular speed sensor.

3. The optical reader according to claim 1, wherein said imaging device has a plurality of pixels arranged two-dimensionally, said electric charge being accumulated in each of said pixels, said photographing controller selecting a reading mode, in which said electrical charge is read out from said plurality of pixels, in accordance with said trembling speed.

4. The optical reader according to claim 3, wherein said photographing controller selects one of a frame mode, in which said electric charge is independently read out from each of said pixels when a value of said trembling speed is lower than a predetermined value, and a field mode, in which said electric charge of said pixels which are placed next to each other are added before being read out when the value of said trembling speed is at least equal to the predetermined value.

5. The optical reader according to claim 1, wherein said electric charge accumulating time is set as one of a first accumulating time, and a second accumulating time that is longer than said first accumulating time.

6. The optical reader according to claim 5, wherein said photographing controller accumulates said electric charge in said imaging device for said first accumulating time, when said sensor senses a first trembling speed, said photographing controller accumulating said electric charge in said imaging device for said second accumulating time, when said sensor senses a second trembling speed which is lower than said first trembling speed.

7. The optical reader according to claim 1, wherein said optical reader comprises a hand held-type reader.

8. An optical reader for optically reading an information pattern representing coded data, comprising:

a casing having an opening enclosed by a frame portion, said opening defining a reading area, said frame portion being positionable on a surface where said information pattern is provided, so that said information pattern is optically read;

a sensor that senses a trembling speed of said casing;

a light source that emits light, whereby said surface is illuminated; and an imaging device which converts an image of said reading area to an electric signal, to accumulate electric charge corresponding to said electric signal;

wherein an electric charge accumulating time and luminance intensity of said light source are controlled in accordance with said trembling speed of said casing as sensed by said sensor;

wherein said electric charge accumulating time is set as a first accumulating time and said luminance intensity is set at a first intensity when said trembling speed is fast, and said electric charge accumulating time is set at a second accumulating time and said luminance intensity is set at a second intensity when said trembling speed is low, said first accumulating time being shorter than said second accumulating time, and said first intensity being higher than said second intensity.

9. An optical reader for optically reading an information pattern representing coded data, comprising:

a casing having an opening enclosed by a frame portion, said opening defining a reading area, said frame portion being positionable on a surface where said information pattern is provided, so that said information pattern is optically read;

a sensor that senses a trembling speed of said casing;

a light source that emits light, whereby said surface is illuminated; and an image device which converts an image of said reading area to an electric signal, to accumulate electric charge corresponding to said electric signal;

wherein an electric charge accumulating time and an electric current supplied to said light source are controlled in accordance with said trembling speed of said casing sensed by said sensor;

wherein said electric charge accumulating time is set at a first accumulating time and said electric current is set as a first current value when said trembling speed is fast, said electric charge accumulating time is set at a second accumulating time and said electric current is set at a second current value when said trembling speed is low, said first accumulating time being shorter than said second accumulating time, and said first current value being larger than said second current value.

10. An optical reader for optically reading an information pattern representing coded data, comprising:

a casing having an opening enclosed by a frame portion, said opening defining a reading area, said frame portion being positionable on a surface where said information pattern is provided, so that said information pattern is optically read;

a sensor that senses a trembling speed of said casing; and an imaging device which converts an image of said reading area to an electric signal to accumulate an electric charge corresponding to said electric signal, said imaging device having a plurality of pixels arranged two-dimensionally, said electric charge being accumulated in each of said pixels, wherein said electric charge is read out from said imaging device in one of a frame mode, in which said electric charge is independently read out from each of said pixels when there is a small possibility of said casing trembling, and in a field mode, in which electric charge of said pixels which are placed next to each other are added before being read out when there is a large possibility of said casing trembling.

11. The optical reader according to claim 10, further comprising a light source that emits light, by which said surface is illuminated, wherein an electric charge accumulating time and a luminance intensity of said light source are variable, in accordance with said trembling speed, when said electric charge is read out in said field mode, and said electric charge accumulating time and said luminance intensity are fixed when said electric charge is read out in said frame mode.

* * * * *